United States Patent
Takishima

(10) Patent No.: US 7,289,400 B2
(45) Date of Patent: Oct. 30, 2007

(54) OPTICAL DISC DRIVE HAVING A MOVABLE ABERRATION CORRECTING LENS

(75) Inventor: Suguru Takishima, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 512 days.

(21) Appl. No.: 10/669,434

(22) Filed: Sep. 25, 2003

(65) Prior Publication Data

US 2004/0066729 A1   Apr. 8, 2004

(30) Foreign Application Priority Data

Oct. 4, 2002   (JP)   ............................ 2002-292680

(51) Int. Cl.
*G11B 7/00*   (2006.01)
(52) U.S. Cl. ............................... 369/44.32; 369/112.23
(58) Field of Classification Search ............. 369/44.32, 369/112.23
See application file for complete search history.

(56) References Cited

U.S. PATENT DOCUMENTS

| | | | |
|---|---|---|---|
| 5,161,040 A * | 11/1992 | Yokoyama et al. ........... 359/19 | |
| 5,600,494 A | 2/1997 | Kubo et al. | |
| 6,418,108 B1 * | 7/2002 | Ueda et al. ............. 369/112.23 | |
| 6,667,943 B1 * | 12/2003 | Maruyama et al. ..... 369/112.08 | |
| 6,791,934 B2 * | 9/2004 | Shimano et al. ........ 369/112.23 | |
| 6,944,104 B2 * | 9/2005 | Tanase et al. ............. 369/44.32 | |
| 2002/0093744 A1 | 7/2002 | Yamamoto et al. | |
| 2003/0021219 A1 | 1/2003 | Nagai | |
| 2003/0152014 A1 | 8/2003 | Maruyama | |

FOREIGN PATENT DOCUMENTS

JP   2002 304763   10/2002
JP   2002 334476   11/2002

* cited by examiner

*Primary Examiner*—Gautam R. Patel
(74) *Attorney, Agent, or Firm*—Greenblum & Bernstein, P.L.C.

(57) ABSTRACT

An optical disc drive includes an optical head having a stationary portion and a movable portion. The movable portion supports an objective lens for converging a beam emitted from the stationary portion on an optical disc. The movable portion moves radially across an optical disc in order to irradiate the beam on a desired track of the optical disc. The optical disc drive is further provided with an aberration correcting lens that corrects aberration caused by the objective lens. The aberration correcting lens is mounted on the movable portion so as to be movable in a direction substantially orthogonal to a movable direction of the movable portion, which may parallel or perpendicular to the optical disc. The aberration correcting lens is moved in accordance with a variation of the aberration caused by the objective lens.

20 Claims, 8 Drawing Sheets

OPTICAL DISC DRIVE HAVING A MOVABLE ABERRATION CORRECTING LENS

BACKGROUND OF THE INVENTION

The present invention relates to an optical disc drive provided with an optical head including a movable lens for correcting aberration generated by an objective lens.

An optical disc, such as a CD-ROM, has a plurality of concentric tracks or a single spiral track along which data is recorded. An optical disc drive reads the data from the track of the optical disc by irradiating a laser beam thereon from an optical head and receiving the reflected light with the same optical head. The optical head is mounted on an actuator that moves radially across the optical disc so as to carry out a track-seeking operation and also to allow the laser beam to correctly trace the target track.

Recently, in accordance with the increase in the recording density and revolving speed of the optical disc, faster track seeking time and more accurate tracing of the track is required for the optical head. In order to meet such a requirement, a so-called split optics design has been developed, in which most of the optical components of the optical head is supported stationary on the optical disc drive, while an objective lens and possibly a few other optical elements are mounted on the movable actuator. The split optics design lowers the mass on the movable actuator and thus allows fast track seeking operation and also correct track tracing.

In split optics design, lenses for correcting aberration caused by the objective lens are mounted on the movable actuator since the relative distance of these lenses to the objective lens is critical for correcting the aberration.

It should be noted that the aberration caused by the objective lens is not constant but varies. One of the leading causes of the variation in the aberration is the change in the wavelength of the laser beam emitted from a semiconductor laser of the optical head in accordance with the temperature increase/decrease of the semiconductor laser. Another leading cause is the change in the shape of the objective lens due to the temperature variation thereof.

Since the aberration of the objective lens may vary as above, the aberration correcting lenses includes a lens that is moved and positioned along the optical axis of the optical head in accordance with the variation of the aberration.

The movable aberration correcting lens, however, experiences a large acceleration during the operation of the optical disc drive since the movable actuator moves quickly in the optical axis direction of the optical head during the track seeking operation and/or the track tracing process. The large acceleration forces the movable aberration correcting lens to be displaced from the desired position, resulting in low positional accuracy thereof and insufficient correction of the aberration.

Therefore, there is a need for an optical disc drive provided with an optical head that is capable of properly correcting aberration caused by an objective lens irrespective of the track seeking operation and/or track tracing operation.

SUMMARY OF THE INVENTION

The present invention is advantageous in that an optical disc drive and an optical head are provided that satisfies the above mentioned need.

An optical disc drive according to an aspect of the invention includes an optical head having a stationary portion and a movable portion. The movable portion supports an objective lens for converging a beam emitted from the stationary portion on an optical disc. Further, the movable portion is arranged so as to move radially across an optical disc. Thus, the movable portion can irradiate the beam on a desired track of the optical disc.

The optical disc drive is further provided with an aberration correcting lens that corrects aberration caused by the objective lens. The aberration correcting lens is mounted on the movable portion so as to be movable in a direction substantially orthogonal to a movable direction of the movable portion, which may parallel or perpendicular to the optical disc. The aberration correcting lens is moved in accordance with a variation of the aberration caused by the objective lens.

In the optical disc drive arranged as above, an inertia force generated by the movement of the movable portion of the optical head acts on the aberration correcting lens in a direction orthogonal to movable direction thereof. Therefore, the movement of the movable portion of the optical head does not affect the position, and hence the aberration correcting ability, of the aberration correcting lens.

Optionally, the optical disc drive further includes a first deflecting member that is mounted on the movable portion. The first deflecting member deflects the beam emitted from the stationary portion in the direction orthogonal to the movable direction of the movable portion. In this case, the aberration correcting lens is disposed on an optical path of the beam deflected by the first deflecting member. Note that the first deflecting member may be a prism or a mirror.

Optionally or additionally, the optical disc drive further includes a second deflecting member mounted on the movable portion so as to deflect the beam deflected the first deflecting member in the movable direction of the movable portion, and the aberration correcting lens is disposed between the first and second deflecting members. Note that the second deflecting member may be a prism or a mirror.

Optionally, the aberration correcting lens is supported by a plate spring, which is arranged in parallel to the movable direction of the movable portion.

According to another aspect of the invention, an optical head is provided that includes a carriage that moves radially across the optical disc, an objective lens supported on the carriage to converge a laser beam on an optical disc, and an aberration correcting lens disposed on an optical path of the laser beam to correct aberration caused by the objective lens. The aberration correcting lens is supported on the carriage so as to be movable in a direction orthogonal to a movable direction of the carriage in accordance with a variation of the aberration caused by the objective lens.

Optionally, the aberration correcting lens is supported by a plate spring fixed to the carriage in parallel to the movable direction of the carriage.

Optionally, a deflecting member is supported on the carriage to deflect the laser beam emitted from a light source in the direction substantially orthogonal to a movable direction of the carriage. In this case, the aberration correcting lens is disposed on an optical path of the laser beam that is deflected by the deflecting member.

BRIEF DESCRIPTION OF THE ACCOMPANYING DRAWINGS

DETAILED DESCRIPTION OF THE EMBODIMENTS

Hereinafter, an optical disc drive according to a first embodiment of the invention will be described with reference to the accompanying drawings.

Figure 1:
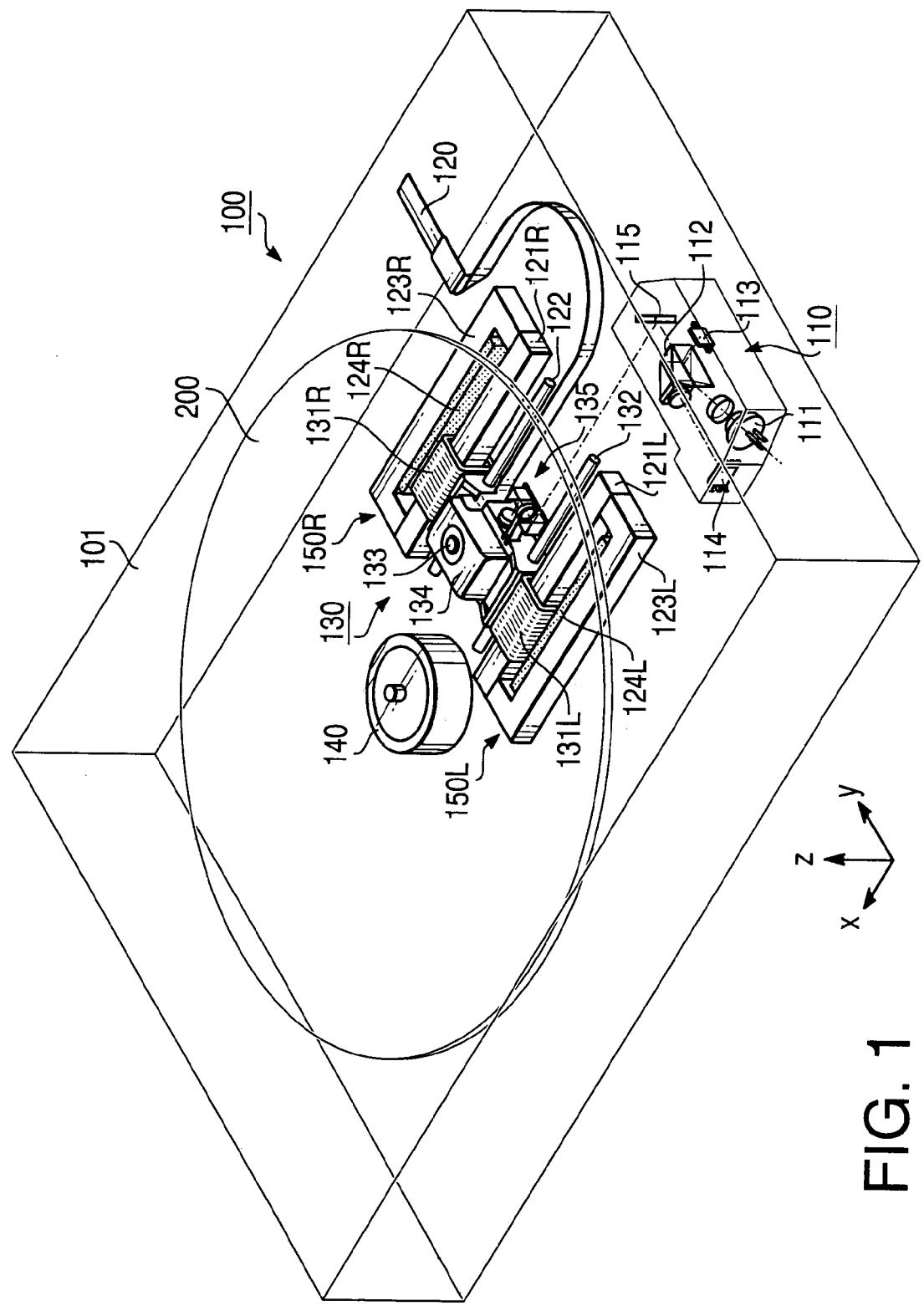
FIG. 1 illustrates a configuration of an optical disc drive according to a first embodiment of the invention.

FIG. 1 illustrates the configuration of the optical disc drive 100 according to the first embodiment. Note that arrows x, y, and z in FIG. 1 indicate directions that are orthogonal to each other.

The optical disc drive 100 includes a casing 101, an optical head composed of a stationary portion 110 and a movable portion 130, and a spindle motor 140 for rotating an optical disc 200. The spindle motor 140 is arranged so that a rotation axis thereof, and hence a rotation axis of the optical disc, is parallel to the z axis direction.

The optical head stationary portion 110 is mounted on the casing 101. The optical head stationary portion 110 includes a laser source 111, a compound prism 112, a light amount monitoring element 113, a light receiving element 114, and a deflecting mirror 115.

The laser source 111 emits a laser beam that is transmitted through the compound prism 112 and then deflected by the deflecting mirror 115 toward the optical head movable portion 130. The laser beam is then bent by the optical head movable portion 130 in the z axis direction, or in a direction parallel to the rotating axis of the optical disc 200, and converged on the optical disc 200. The recording medium of the optical disc 200 reflects the laser beam back toward the optical head movable portion 130 so that the laser beam travels therethrough and then back to the optical head stationary portion 110. The laser beam that has re-entered the optical head stationary portion 110 is reflected by the deflecting mirror 115, passes through the compound prism 112, and impinges on the light receiving element 114.

A part of the laser beam emitted from the laser source 111 is reflected by the compound prism 112 toward the light amount monitoring element 113 that detects the power of the laser beam. The detection of the light amount monitoring element 113 is utilized for controlling the output power of the laser source 111.

The optical disc 200 has a plurality of tracks formed thereon in concentric circles. The optical head movable portion 130 is supported so as to be movable radially across the optical disc 200. Thus, the optical head movable portion 130 is capable of irradiating the laser beam on any desirable track of the optical disc 200.

The optical head stationary portion 110 is arranged such that the laser beam emitted therefrom toward the optical head movable portion 130 travels in a direction that coincides with the moving direction of the optical head movable portion 130. Thus, the laser beam can travel between the stationary and movable portions of the optical head irrespective of the location of the optical head movable portion 130.

Hereinafter, the optical head movable portion 130 and a driving mechanism for moving it radially across the optical disc 200 will be described.

The optical head movable portion 130 has a carriage 134 on which an objective lens 133 of the optical head is supported. The carriage 134 is slidably supported by two guide shafts 122 and 132 so as to be movable toward/away from the rotation axis of the optical disc 200 (and in parallel to the x axis direction, in the present embodiment). The carriage 134 is coupled, at respective sides thereof, to a pair of voice coil motors 150R and 150L, which generates the driving force to slide the optical head movable portion 130 along the guide shafts 122 and 132.

The voice coil motor 150L has a coil 131L that is fixed to one side of the carriage 134 and slidably mounted on a center yoke 121L. The center yoke 121L is an elongated member disposed in parallel to the guide shafts 122 and 132. A side yoke 123L having a U like shape is attached to one side of the center yoke 121L so as to form a closed loop together with the center yoke 121L. An elongated permanent magnet 124L is attached on the side yoke 123L at a side thereof facing the center yoke 121L.

In the voice coil motor 150L arranged as above, the coil 131L is disposed in a static magnetic field generated by the permanent magnet 124L. If current is applied to the coil 131L, a magnetic force is generated that moves the coil 131L along the center yoke 121L.

It should be noted that the voice coil motor 150R has substantially the same configuration as the voice coil motor 150L. Thus, detailed description of the voice coil motor 150R will be omitted.

Figure 2:
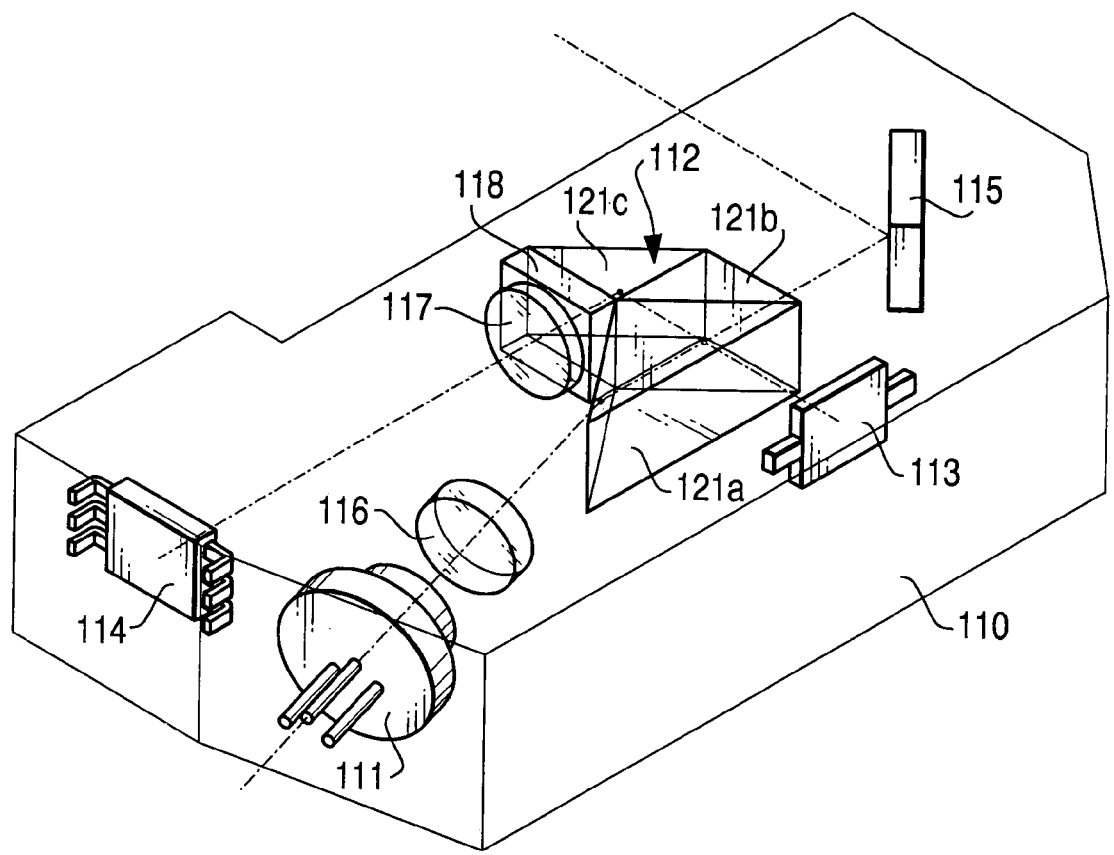
FIG. 2 illustrates a configuration of an optical head stationary portion of the optical disc drive shown in FIG. 1.
Figure 2:
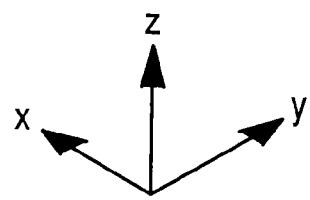

FIG. 2 illustrates the configuration of the optical head stationary portion 110. As shown in FIG. 2, the compound prism 112 is composed of a beam shape correcting prism 121a, a first triangular prism 121b, and a second triangular prism 121c.

The laser beam emitted from the laser source 111 is collimated by a collimator lens 116 and then enters the beam shape correcting prism 112. In the present embodiment, the laser source 111 is a semiconductor laser source. Thus, the laser beam collimated by the collimator lens 116 has an elliptic cross section. The surface of the beam shape correcting prism 121a on which the laser beam is incident is inclined against the center axis of the laser beam for a predetermined angle so that the laser beam passed through that surface becomes to have a circular cross section.

The laser beam transmits through the beam shape correcting prism 121a and then impinges on the first prism 121b. The laser beam is divided at the entrance face of the first prism 121b into two beams. One of the two beams passes through and emerges from the first prism 121b toward the deflection mirror 115, while the other one is reflected by the entrance face of the first prism 121b toward the light amount monitoring element 113.

The laser beam that has traveled from the optical head movable portion 130 back to the optical head stationary portion 110 is first reflected by the deflecting mirror 115 and enters the first prism 121b. Then, the laser beam is reflected by the surface of the first prism 121b facing the beam shape correcting prism 121a and enters the second prism 121c. Within the second prism 121c, the laser beam is reflected by a reflection surface of the second prism 121c toward an beam splitting element 118 for splitting the laser beam into beams for reproducing data, controlling focus, and controlling the tracking position. The laser beam is transmitted through the beam splitting element 118, and then converged on the light receiving element 114 by a converging lens 117. The light receiving surface of the light receiving element 114 is divided into areas for detecting respective beams emerging from the beam splitting element 118 to respectively generate a data reproducing signal, focus control signal, and tracking position control signal. The outputs of the light receiving element 114 is used for tracing the track on the optical disc 200 and also for reproducing the data recorded on the optical disc 200.

Figure 3:
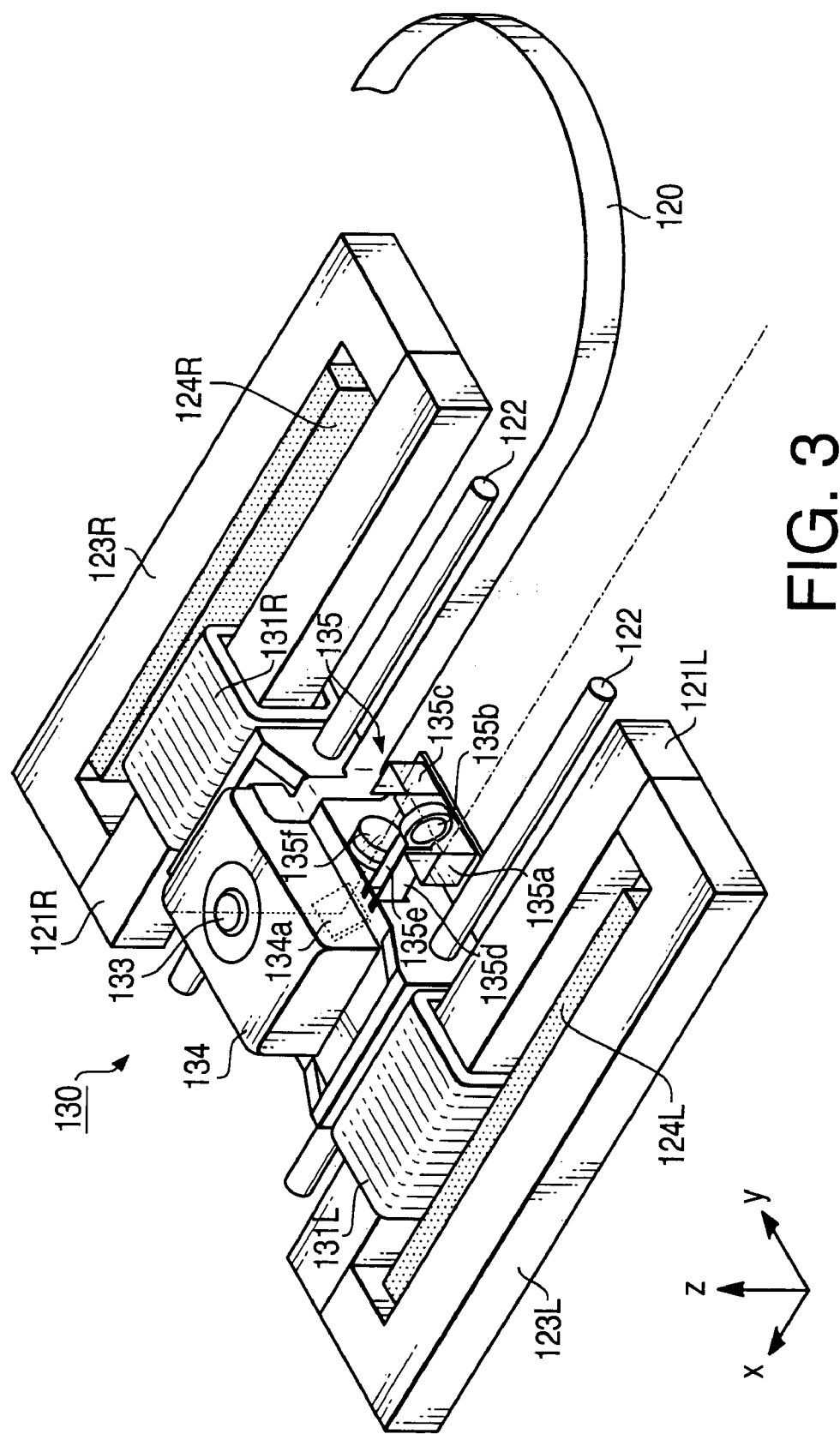
FIG. 3 is an enlarged perspective view of an optical head movable portion and voice coil motors of the optical disc drive shown in FIG. 1.

FIG. 3 is an enlarged perspective view of the optical head movable portion 130 and the pair of voice coil motors 150L and 150R. As shown in FIG. 3, a spherical aberration correcting lens unit 135 is mounted on the front end (i.e. the end nearer to the optical head stationary portion 110) of the carriage 134. The spherical aberration correcting lens unit 135 includes a first reflection prism 135a, a movable lens 135b, a second reflection prism 135c, and a stationary lens group 135f. The first reflection prism 135a, the movable lens 135b, and the second reflection prism 135c are arranged in this order in the y axis direction, or a direction perpendicular to the movable direction of the optical head movable portion 130 (i.e., the x axis direction) and parallel to the surface of the optical disc 200. Further, the second reflection prism 135c and the stationary lens group 135f are arranged in the movable direction of the optical head movable portion 130 (i.e., the x axis direction).

The laser beam emitted from the optical head stationary portion 110 toward the optical head movable portion 130 impinges on the first prism 135a. The first reflection prism 135a reflects the incident laser beam at an angle of 90° so that the laser beam propagates in the y axis direction. The laser beam then passes through the movable lens 135b and impinges on the second reflection prism 135c. The second reflection prism 135c reflects the laser beam at an angle of 90° so that the laser beam travels again in the x axis direction toward the stationary lens group 135f. Then, the laser beam travels through the stationary lens group 135f and into the carriage 134. In the carriage 134, a deflection mirror 134a deflects the laser beam incident thereon at an angle of 90° so that the laser beam propagates in the z axis direction, or in a direction perpendicular to the optical disc 200. Then, the laser beam is converged on the optical disc 200 by the objective lens 133.

As previously mentioned, the laser beam is reflected by the optical disc 200 back to the objective lens 133. The reflected laser beam travels along the optical path along which the laser beam emitted from the laser source 111 has traveled from the optical head stationary portion 110 toward the optical disc 200 and thereby returns to the optical head stationary portion 110.

Figure 4:
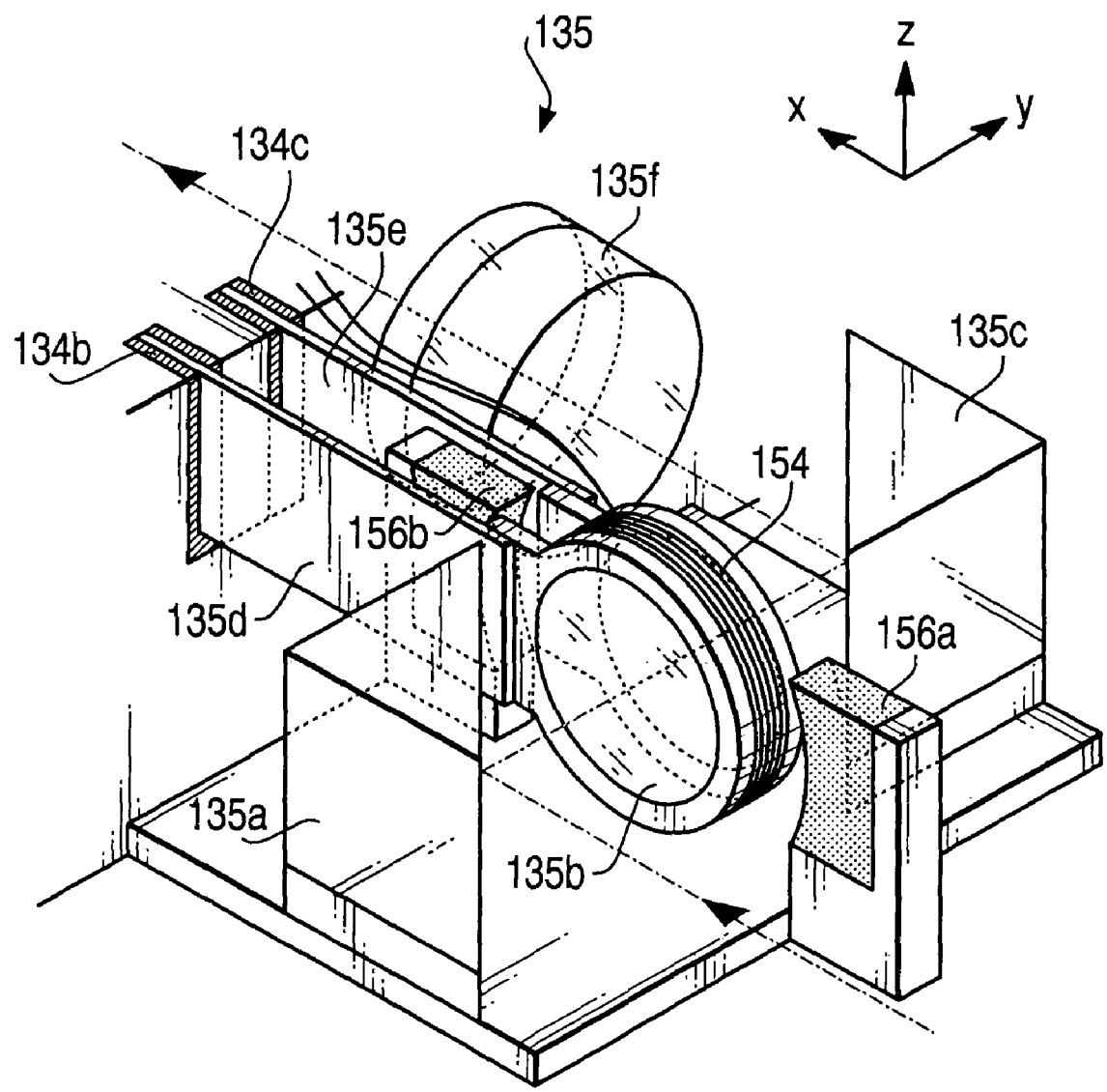
FIG. 4 is an enlarged perspective view of the spherical aberration correcting unit of the optical head movable portion shown in FIG. 3.

FIG. 4 is an enlarged perspective view of the spherical aberration correcting unit 135.

The movable lens 135b is supported by a pair of plate springs 135d and 135e fixedly secured to the carriage 134 by inserting the ends thereof into respective grooves 134b and 134c formed on the carriage 134. The plate springs 135d and 135e are arranged so as to extend in the x axis direction. More particularly, the plate springs 135b and 134c are arranged in parallel to a plane that is parallel to the movable direction of the optical head movable portion 130 and perpendicular to the optical disc 200.

A coil 154 is wound around the movable lens 135b. Further, a pair of permanent magnets 156a and 156b is disposed on opposite sides of the movable lens 135b. The permanent magnets 156a and 156b are arranged such that the sides thereof facing the movable lens 135b, or the coil 154 wound therearound, have the same pole, e.g. the N pole. The coil 154 and the pair of permanent magnets 156a and 156b constitute an actuator similar to a voice coil motor. Since the center axis of the coil 154 is parallel to the y axis direction, this actuator drives the movable lens in the y axis direction as current is applied to the coil 154. The direction and distance of the displacement of the movable lens 135b depends on the direction and amount of the current passing through the coil 154. Note that a flexible cable 120 is connected to the optical head movable portion 130 to supply driving current to the coil 154.

It should be noted that the optical head movable portion 130 is provided with a not shown sensor that detects the amount of the spherical aberration generated at the objective lens 133. The actuator, composed of the coil 154 and the pair of permanent magnets 156a and 156b, moves the movable lens 135b in the y axis direction based on the detection of that sensor to correct the spherical aberration. Thus, even if the spherical aberration has changed due to wavelength variation of the laser beam or the expansion of the objective lens with temperature, the spherical aberration can be properly corrected by the spherical aberration correcting unit 135.

It should be noted that, an acceleration acts on the movable lens 135b as the optical head movable portion 130 is moved across the optical disc 200. However, in the optical head movable portion 130 arranged as above, that acceleration acts on the movable lens 135b in the direction orthogonal to the movable direction of the movable lens 135b. Accordingly, the track seeking operation and/or track tracing operation of the optical head movable portion 130 does not affect the position of the movable lens 135b. In other word, the track seeking operation and/or the track tracing operation of the optical head does not affect the aberration correcting ability of the spherical aberration correcting unit 135.

Now, an optical disc drive according to a second embodiment of the invention will be described with reference to FIGS. 5 and 6, in which elements that are substantially the same as those described in the first embodiment are denoted by the same reference numbers. It should be noted that the optical disc drive according to the second embodiment has substantially the same configuration as that of the first embodiment except the arrangement of the spherical aberration correcting unit. Therefore, only the arrangement of the spherical aberration correcting unit will be described in detail hereinafter.

Figure 5:
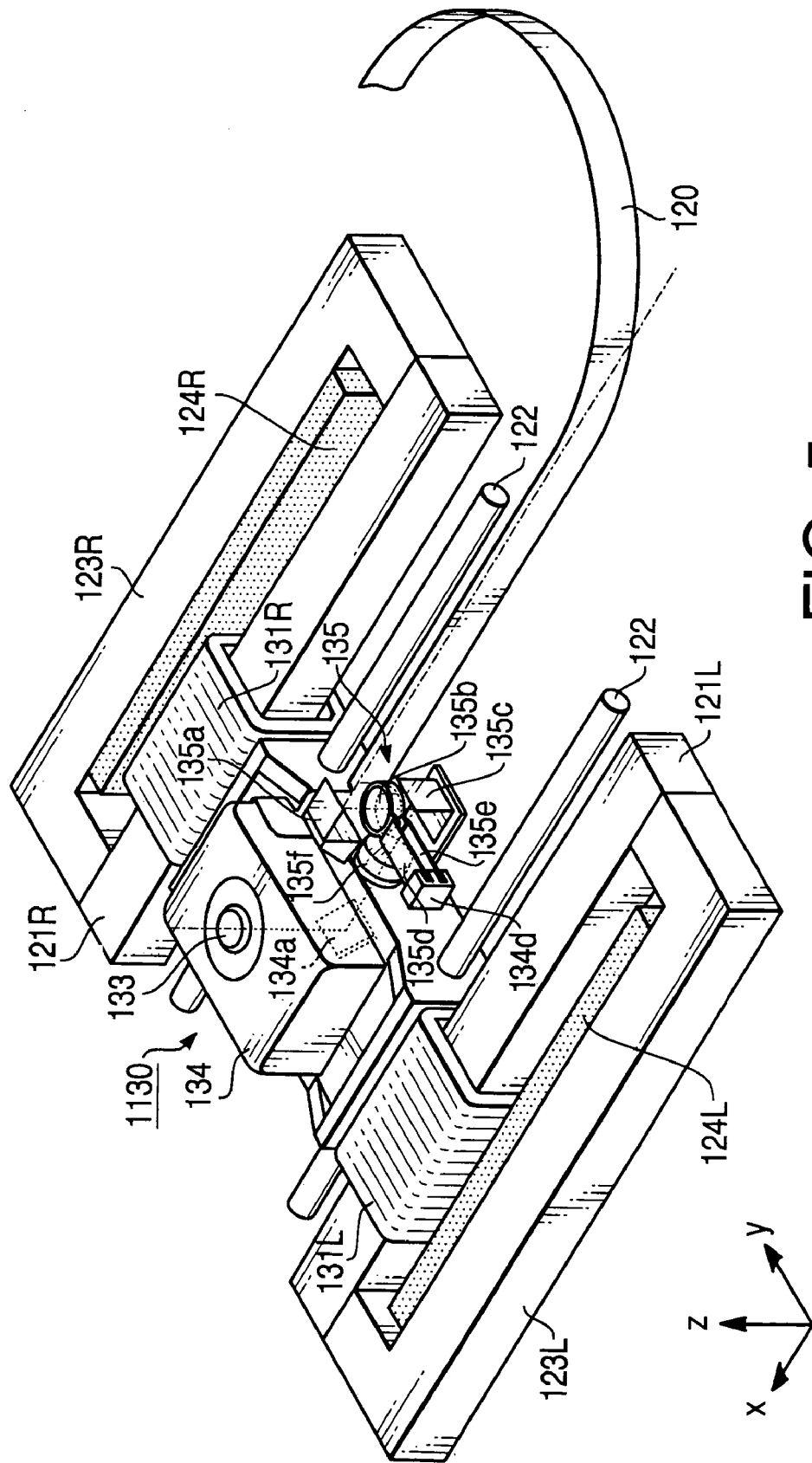
FIG. 5 is an enlarged perspective view of an optical head movable portion and voice coil motors of an optical disc drive according to a second embodiment of the invention.

FIG. 5 is an enlarged perspective view of the optical head movable portion 1130 and the pair of voice coil motors 150L and 150R of the optical disc drive according to the second embodiment. FIG. 6 is an enlarged perspective view of the spherical aberration correcting unit 1135 of the optical head movable portion 1130 shown in FIG. 5.

Figure 6:
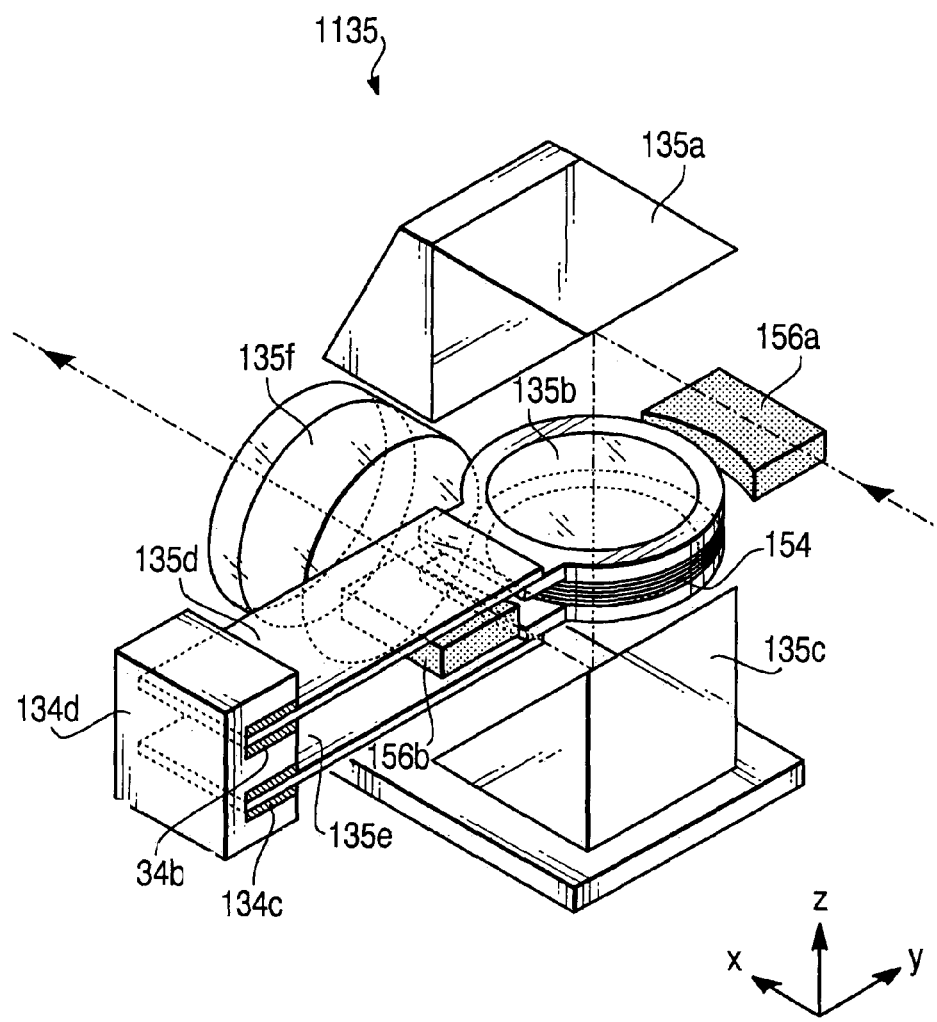
FIG. 6 is an enlarged perspective view of the spherical aberration correcting unit of the optical disc drive according to the second embodiment of the invention.

In the spherical aberration correcting unit 1135 shown in FIGS. 5 and 6, the first reflection prism 135a, the movable lens 135b, and the second reflection prism 135c are arranged in the z axis direction, i.e. in a direction perpendicular to both the movable direction of the optical head movable portion 130 and the optical disc 200. The plate springs 135d and 135e supporting the movable lens 135b are arranged so as to be parallel with the optical disc 200, or perpendicular to the z axis direction. Thus, the plate springs 135d allows the movable lens 135b to displace only in the z axis direction.

As with in the first embodiment, the coil 154 is wound around the movable lens 135b, and the pair of permanent magnets 156a and 156b are disposed on opposite sides of the movable lens 135. It should be noted, however, that the center axis of the coil 154 is parallel to the z axis direction in this case. Accordingly, if current is applied to the coil 154, the movable lens 154 is driven in the z axis direction.

As with in the first embodiment, an acceleration acts on the movable lens 135*b* in the direction orthogonal to the movable direction of the movable lens 135*b* as the optical head movable portion 1130 is moved across the optical disc 200. Accordingly, the track seeking operation and/or the track tracing operation of the optical head movable portion 1130 does not affect the position of the movable lens 135*b*, or the aberration correcting ability of the spherical aberration correcting unit 135.

While the invention has been described in detail with reference to specific embodiments thereof, it would be apparent to those skilled in the art that various changes and modifications may be made therein without departing from the spirit of the invention, the scope of which is defined by the attached claims.

Figure 7:
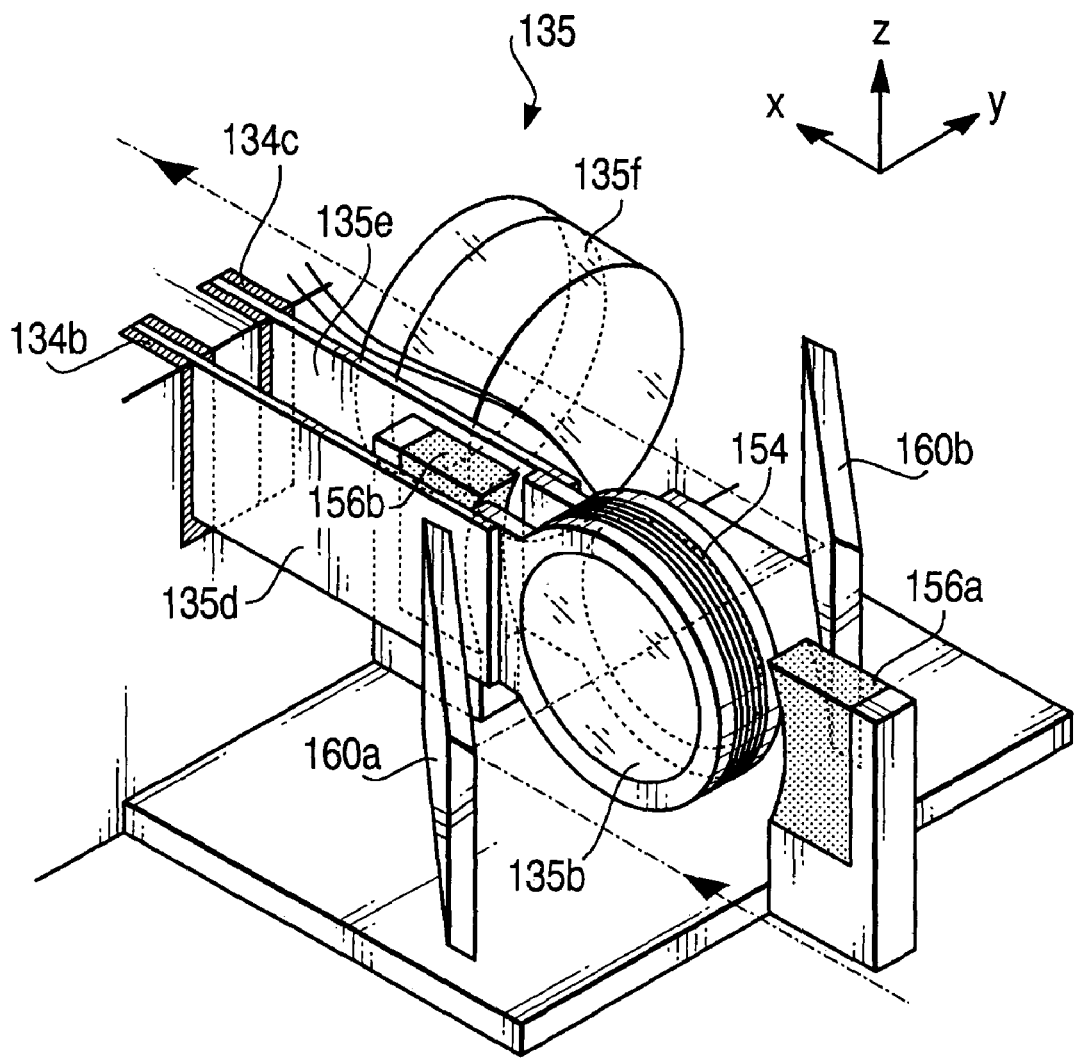
FIGS. 7 and 8 illustrate variations of the spherical aberration correcting units shown in FIGS. 4 and 6, respectively.
Figure 8:
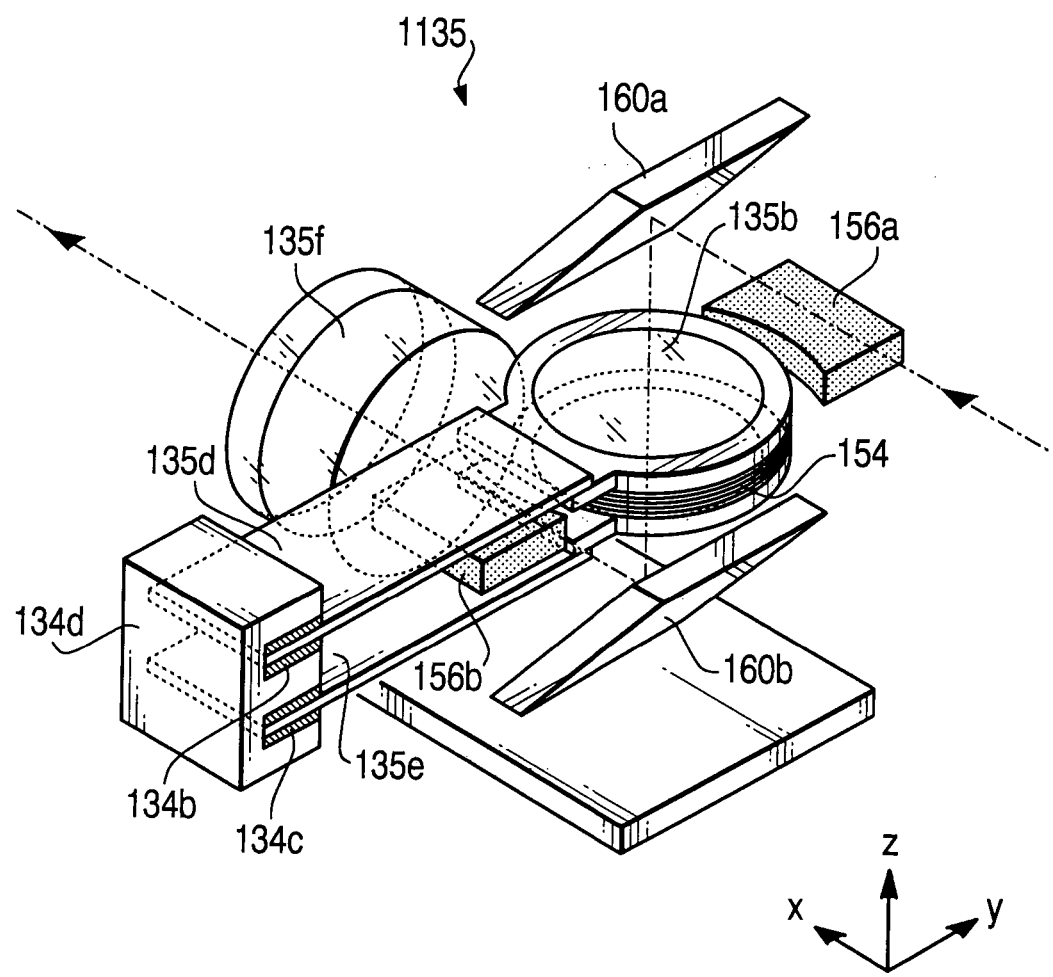

For example, the first and second reflection prisms 135*a* and 135*c* shown in FIGS. 4 and 6 may be replaced with mirrors 160*a* and 160*b* as shown in FIGS. 7 and 8, respectively.

The present disclosure relates to the subject matter contained in Japanese Patent Application No. P2002-292680, filed on Oct. 4, 2002, which is expressly incorporated herein by reference in its entirety.

What is claimed is:

1. An optical disc drive, comprising:
   an optical head including a stationary portion and a movable portion, said movable portion supporting an objective lens which converges a beam emitted from said stationary portion on an optical disc, said movable portion moving radially across the optical disc; and
   an aberration correcting lens mounted on said movable portion, wherein said aberration correcting lens corrects an aberration caused by said objective lens by moving in a direction substantially orthogonal to a movable direction of said movable portion and in accordance with a variation of the aberration cause by the objective lens.

2. The optical disc drive according to claim 1, wherein said aberration correcting lens is mounted on said movable portion movably in a direction parallel to the optical disc.

3. The optical disc drive according to claim 1, wherein said aberration correcting lens is mounted on said movable portion movably in a direction perpendicular to said optical disc.

4. The optical disc drive according to claim 1, further comprising a first deflector mounted on said movable portion, said first deflector deflecting the beam the emitted from said stationary portion in the direction orthogonal to the movable direction of said movable portion,
   wherein said aberration correcting lens is disposed on an optical path of the beam deflected by said first deflector.

5. The optical disc drive according to claim 4, wherein said first deflector comprises a prism.

6. The optical disc according to claim 4, wherein said deflector comprises a mirror.

7. The optical disc according to claim 4, further comprising a second deflector mounted on said movable portion, said second deflector deflecting the beam deflected by said first deflector in the movable direction of said movable portion,
   wherein said aberration correcting lens is disposed between said first and second deflectors.

8. The optical disc drive according to claim 7, wherein said second deflector comprises a prism.

9. The optical disc drive according to claim 7, wherein said second deflector comprises a mirror.

10. The optical disc drive according to claim 1, wherein said aberration correcting lens is supported by a plate spring, said plate spring being arranged in parallel to the movable direction of said movable portion.

11. An optical head, comprising:
    a carriage that moves radially across an optical disc;
    an objective lens supported on said carriage, said objective lens converging a laser beam on the optical disc; and
    an aberration correcting lens disposed on an optical path of the laser beam, wherein said aberration correcting lens corrects an aberration caused by said objective lens by moving in a direction substantially orthogonal to a movable direction of said carriage and in accordance with a variation of the aberration caused by the objective lens.

12. The optical head according to claim 11, wherein said aberration correcting lens is supported on said carriage movably in a direction parallel to the optical disc.

13. The optical head according to claim 11, wherein said aberration correcting lens is supported on said carriage movably in a direction perpendicular to said optical disc.

14. The optical head according to claim 11, further comprising a first deflector supported on said carriage, said first deflector deflecting the laser beam emitted from a light source in the direction substantially orthogonal to the movable direction of said carriage,
    wherein said aberration correcting lens is disposed on an optical path of the laser beam deflected by said first deflector.

15. The optical head according to claim 14, wherein said first deflector comprises a prism.

16. The optical head according to claim 14, wherein said first deflector comprises a mirror.

17. The optical head according to claim 14, further comprising a second deflector supported on said carriage, said second deflector deflecting the laser beam deflected by said first deflector in the movable direction of said carriage,
    wherein said aberration correcting lens is disposed between first and second deflectors.

18. The optical head according to claim 17, wherein said second deflector comprises a prism.

19. The optical head according to claim 17, wherein said second deflector comprises a mirror.

20. The optical head according to claim 11, wherein said aberration correcting lens is supported by a plate spring fixed to said carriage in parallel to the movable direction of said carriage.

* * * * *